United States Patent
Shimoda (10) Patent No.: US 12,286,006 B2
(45) Date of Patent: Apr. 29, 2025

(54) MOUNTING STRUCTURE FOR ELECTRICAL DEVICE

(71) Applicant: NISSAN MOTOR CO., LTD., Yokohama (JP)

(72) Inventor: Takayuki Shimoda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/717,932

(22) PCT Filed: Dec. 10, 2021

(86) PCT No.: PCT/JP2021/045553
§ 371 (c)(1),
(2) Date: Jun. 7, 2024

(87) PCT Pub. No.: WO2023/105757
PCT Pub. Date: Jun. 15, 2023

(65) Prior Publication Data
US 2024/0416737 A1    Dec. 19, 2024

(51) Int. Cl.
*B60K 1/04* (2019.01)
*B62D 25/20* (2006.01)

(52) U.S. Cl.
CPC .............. *B60K 1/04* (2013.01); *B62D 25/20* (2013.01); *B60K 2001/0438* (2013.01)

(58) Field of Classification Search
CPC ... B60K 1/04; B60K 2001/0438; B62D 25/20
See application file for complete search history.

(56) References Cited

U.S. PATENT DOCUMENTS

| 6,411,514 B1* | 6/2002 | Hussaini | H05K 7/209 |
| | | | 361/689 |
| 8,016,063 B2* | 9/2011 | Tsuchiya | B60K 1/04 |
| | | | 180/68.5 |
| 9,648,764 B2 | 5/2017 | Nakashima | |
| 10,093,249 B2 | 10/2018 | Ando et al. | |
| 10,784,752 B2 | 9/2020 | Tokito | |
| 2010/0213741 A1* | 8/2010 | Suzuki | B62D 25/2036 |
| | | | 296/193.07 |

(Continued)

FOREIGN PATENT DOCUMENTS

| JP | 4650010 B2 | 3/2011 |
| JP | 2013-203299 A | 10/2013 |

(Continued)

*Primary Examiner* — Jason D Shanske
*Assistant Examiner* — James J Triggs
(74) *Attorney, Agent, or Firm* — Foley & Lardner LLP (57) ABSTRACT

A mounting structure for an electrical device includes a vehicle electrical device and a supporting member which supports the electrical device. The supporting member includes: a body portion to which the electrical device is supported and fixed; and a front extension portion extending from the body portion toward a vehicle front side further than an end portion of the electrical device at a vehicle front side. The body portion and an end portion of the front extension portion at the vehicle front side are fixed to the vehicle body floor, and a rigidity of the front extension portion in a vehicle front-rear direction is lower than a rigidity of the body portion in the vehicle front-rear direction.

5 Claims, 6 Drawing Sheets (56) References Cited

U.S. PATENT DOCUMENTS

| | | |
|---|---|---|
| 2011/0162902 A1 | 7/2011 | Dobbins et al. |
| 2012/0118653 A1 | 5/2012 | Ogihara et al. |
| 2015/0305177 A1 | 10/2015 | Nakashima |
| 2018/0056901 A1 | 3/2018 | Ando et al. |
| 2018/0065442 A1* | 3/2018 | Maier .................... B60H 1/246 |
| 2019/0245415 A1 | 8/2019 | Tokito |

FOREIGN PATENT DOCUMENTS

| | | |
|---|---|---|
| JP | 2015-074435 A | 4/2015 |
| JP | 2015-205597 A | 11/2015 |
| JP | 2016-123165 A | 7/2016 |
| JP | 2017-030444 A | 2/2017 |
| JP | 2018-030557 A | 3/2018 |
| JP | 2019-001190 A | 1/2019 |
| JP | 2019-131132 A | 8/2019 |
| JP | 2019-155993 A | 9/2019 |
| WO | WO-2011/013717 A1 | 2/2011 |

* cited by examiner

MOUNTING STRUCTURE FOR ELECTRICAL DEVICE

TECHNICAL FIELD

The present invention relates to a mounting structure for an electrical device.

BACKGROUND ART

Patent Literature 1 discloses a vehicle-mounted structure for a vehicle-mounted fuel cell in which a fuel cell case is arranged below a floor panel of the vehicle. In the vehicle-mounted structure, a floor reinforcing member for reinforcing the floor panel also serves as a reinforcing member for reinforcing the fuel cell case.

CITATION LIST

Patent Literature

Patent Literature 1: JP Patent No. 4650010

SUMMARY OF INVENTION

Technical Problem

Meanwhile, in a conventional mounting structure for an electrical device, a collision load from the vehicle front side is input to an electrical device at the time of a vehicle front collision, which may cause the electrical device to be displaced toward the vehicle rear side in some cases. If a different vehicle-mounted device is arranged adjacent to the rear side of the electrical device, the electrical device comes into contact with the different vehicle-mounted device arranged at the vehicle rear side, which may cause an excessive collision load to be input to the different vehicle-mounted device in some cases.

An object of the present invention is to suppress the displacement of an electrical device toward a vehicle rear side at the time of a vehicle front collision.

Technical Solution

A mounting structure for an electrical device according to an aspect of the present invention includes: a vehicle electrical device; and a supporting member which supports the electrical device at an upper side of a vehicle body floor. The supporting member includes: a body portion to which the electrical device is supported and fixed; and a front extension portion extending from the body portion toward a vehicle front side further than an end portion of the electrical device at a vehicle front side. The body portion and an end portion of the front extension portion at the vehicle front side are fixed to the vehicle body floor, and a rigidity of the front extension portion in a vehicle front-rear direction is lower than a rigidity of the body portion in the vehicle front-rear direction.

Advantageous Effects

The present invention makes it possible to suppress the displacement of an electrical device toward a vehicle rear side at the time of a vehicle front collision.

DESCRIPTION OF EMBODIMENTS

Hereinafter, a mounting structure for an electrical device according to an embodiment will be described with reference to the drawings. In each figure, FR and RR denote a front side and a rear side in a vehicle front-rear direction respectively, LH and RH denote a left side and a right side in a vehicle width direction respectively, and UP and DN denote an upper side and a lower side in a vehicle up-down direction respectively. In addition, the center side of a vehicle in the vehicle width direction is called "an inward side in the vehicle width direction/inward in the vehicle direction", and the side opposite to the inward side in the vehicle width direction is called "an outward side in the vehicle width direction/outward in the vehicle direction". In the following description, the front side and the rear side in the vehicle front-rear direction, the left side and the right side in the vehicle width direction, and the upper side and the lower side in the vehicle up-down direction are simply called "vehicle front side", "vehicle rear side", "vehicle left side", "vehicle right side", "upper side/upward", and "lower side/downward", respectively. The elements having the same function are denoted by the same reference numerals, and a description thereof will be omitted.

As illustrated in FIGS. 1 to 4, a vehicle is provided with a vehicle body floor 1. In the illustrated example, the vehicle body floor 1 has a substantially rectangular shape when in plan view. The vehicle body floor 1 may also include a floor panel 2, a cross member 3, and a reinforcing member 4.

The floor panel 2 is a plate-like member that separates the inner side of the vehicle from the outer side of the vehicle. The floor panel 2 illustrated in the figures is a plate-like member having a substantially rectangular shape in plan view, and may be made of metal such as iron or steel or resin. The floor panel 2 may be joined to a dash panel (not illustrated) at vehicle front side. A pair of side sills (not illustrated) extending in the vehicle front-rear direction may be joined to both end portions of the floor panel 2 in the vehicle width direction. In the illustrated example, a cross member 3 is joined to the upper surface of the floor panel 2.

The cross member 3 is a vehicle body skeleton member for reinforcing the vehicle body floor 1. The cross member 3 is a long member extending in the vehicle width direction between the pair of side sills, and may have a substantially hat-shaped cross-sectional shape which is open downward, for example. In the illustrated example, the cross member 3 is attached to the vehicle front side on the floor surface in the vehicle interior, and the front seat (not illustrated) at the vehicle front side may be fastened and fixed by a fastener such as a bolt. The pair of side sills and the cross member 3 may be made of, for example, metal such as iron or steel.

In the illustrated example, a bulging portion 5 is formed at the substantially central portion of the floor panel 2 in the vehicle width direction at the vehicle front side. The bulging portion 5 is formed by causing a portion of the floor panel to be bulged in such a manner that the portion of the floor panel projects upward, and extends in the vehicle front-rear direction. The bulging portion 5 forms the vehicle front side of the vehicle floor tunnel, and a space 6 is formed at the lower side of the bulging portion 5. For example, a muffler (not illustrated) can be arranged in the space 6. The muffler is a device for reducing the exhaust noise of an engine and is provided in a portion of an exhaust pipe for discharging the exhaust gas discharged from the engine toward the vehicle rear side.

In the illustrated example, an inclined surface 7 is formed on the vehicle rear side of the bulging portion 5. The inclined surface 7 is a surface having a downward slope toward the vehicle rear side. In addition, the inclined surface 7 faces front extension portions 40, which will be described later, in the up-down direction. The cross member 3 is arranged at the vehicle rear side of the inclined surface 7. The inclined surface 7 illustrated in the figures is formed of a curved surface which is convex toward the vehicle rear side in a cross section perpendicular to the vehicle width direction; however, the present invention is not limited thereto. The inclined surface 7 may be formed of a flat surface, a curved surface which is convex toward the vehicle front side, or a combination of a flat surface and a curved surface.

In the illustrated example, the reinforcing member 4 is attached to the upper side of the protruding portion 5. The reinforcing member 4 is a member having a substantially C-shaped cross section extending in the vehicle front-rear direction, and may be made of metal such as iron or steel, or resin, for example. The reinforcing member 4 may be joined to at least a portion of the upper surface and side surface of the bulging portion 5 by means of, for example, welding. This makes it possible to further increase the rigidity of the bulging portion 5 in the vehicle front-rear direction and in the vehicle up-down direction.

The mounting structure for an electrical device according to the embodiment includes an electrical device 10 and a supporting member 20. In the example illustrated in FIGS. 1 to 4, the electrical device 10 and the supporting member 20 are covered with a console panel forming the exterior of a center console (not illustrated). That is, the electrical device 10 and the supporting member 20 are arranged at the inner side of the center console. The position in which the electrical device 10 and the supporting member 20 are arranged is not limited thereto, and can be appropriately set according to, for example, the shape of a vehicle, the shape of a vehicle compartment, and the functions provided in the electrical device 10.

The electrical device 10 is a vehicle-mounted device having a housing made of, for example, metal such as aluminum. The electrical device 10 may be a power converter that steps up or steps down an input voltage, and outputs the voltage. The electrical device 10 illustrated in the figures is a DC-DC converter that steps down a voltage input from a vehicle-mounted battery (not illustrated) provided in the vehicle and outputs the voltage. This makes it possible to step down a voltage input from the vehicle-mounted battery to an appropriate voltage, and supply the step-down voltage to the electric components arranged in the respective units of the vehicle. The electrical device 10 is not limited to a DC-DC converter, and may be a vehicle-mounted device such as an inverter, an air conditioner compressor, a control unit for controlling actuators arranged in the respective units of the vehicle.

Figure 6:
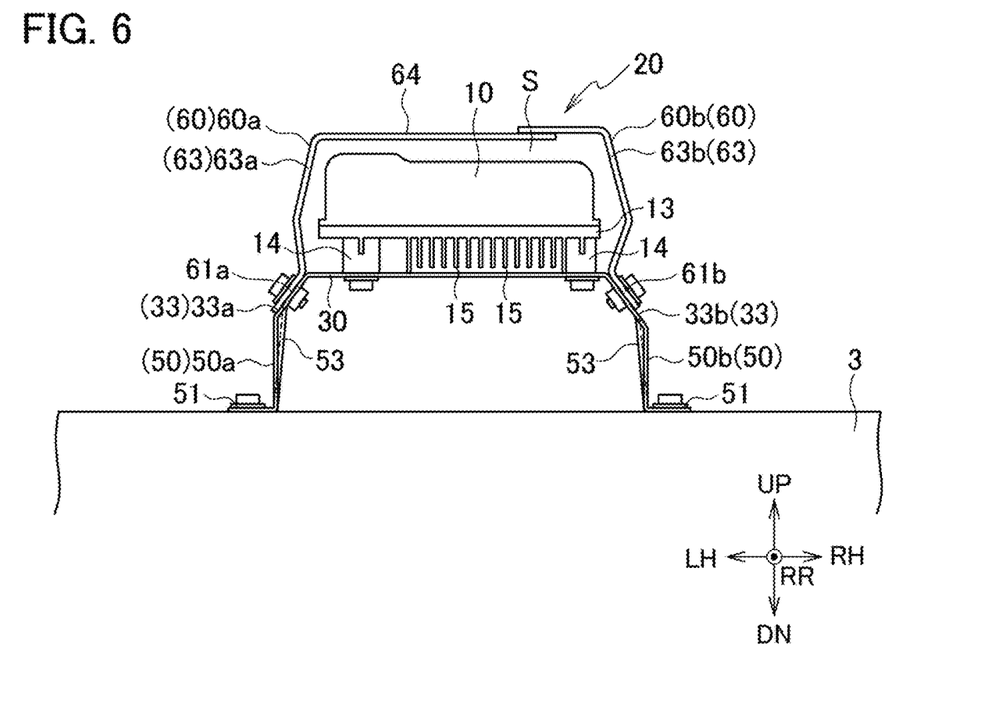
FIG. 6 is a schematic partial cross-sectional view of the mounting structure for an electrical device according to the embodiment along line VI-VI of FIG. 3, which illustrates the arrangement relationship between the electrical device and the supporting member.

As illustrated in FIG. 6, a plurality of fixing portions 14 for fastening and fixing the electrical device 10 to the supporting member 20 are provided at a bottom portion 13 of the housing of the electrical device 10. In the illustrated example, the fixing portions 14 are respectively provided at the vehicle left side and the vehicle right side in the vehicle front side of the bottom portion 13, and respectively provided at the vehicle left side and the vehicle right side in the vehicle rear side. The electrical device 10 may also include heat radiation fins 15. The heat radiation fins 15 are plate-like members that release heat from the electrical device 10 to the outside, and may be a metal flat plate made of, for example, aluminum. In addition, the heat radiation fins 15 may extend in the vehicle front-rear direction. The heat radiation fins 15 illustrated in the figure are provided at the bottom 13; however, the present invention is not limited thereto. For example, the heat radiation fins 15 may be provided at the upper side or side of the electrical device 10.

A vehicle-mounted device such as a different electrical device may be arranged at the vehicle rear side of the electrical device 10. In the example illustrated in FIGS. 1 to 4, a junction box 71 is arranged at the vehicle rear side of the electrical device 10. The junction box 71 has, for example, a hollow box housing made of resin, and a relay or a fuse for high voltage is arranged at the inner side of the housing. The electric power output from the vehicle-mounted battery is input to the electrical device 10 through the junction box 71, then stepped down and is supplied to the electric components in the respective units of the vehicle via the terminals provided in an end portion 11. The end portion 11 is an end portion at the vehicle front side of the electrical device 10. A duct 72 for guiding cooling air to the electrical device 10 may be connected to an end portion 12 at the vehicle rear side of the electrical device 10.

Figure 1:
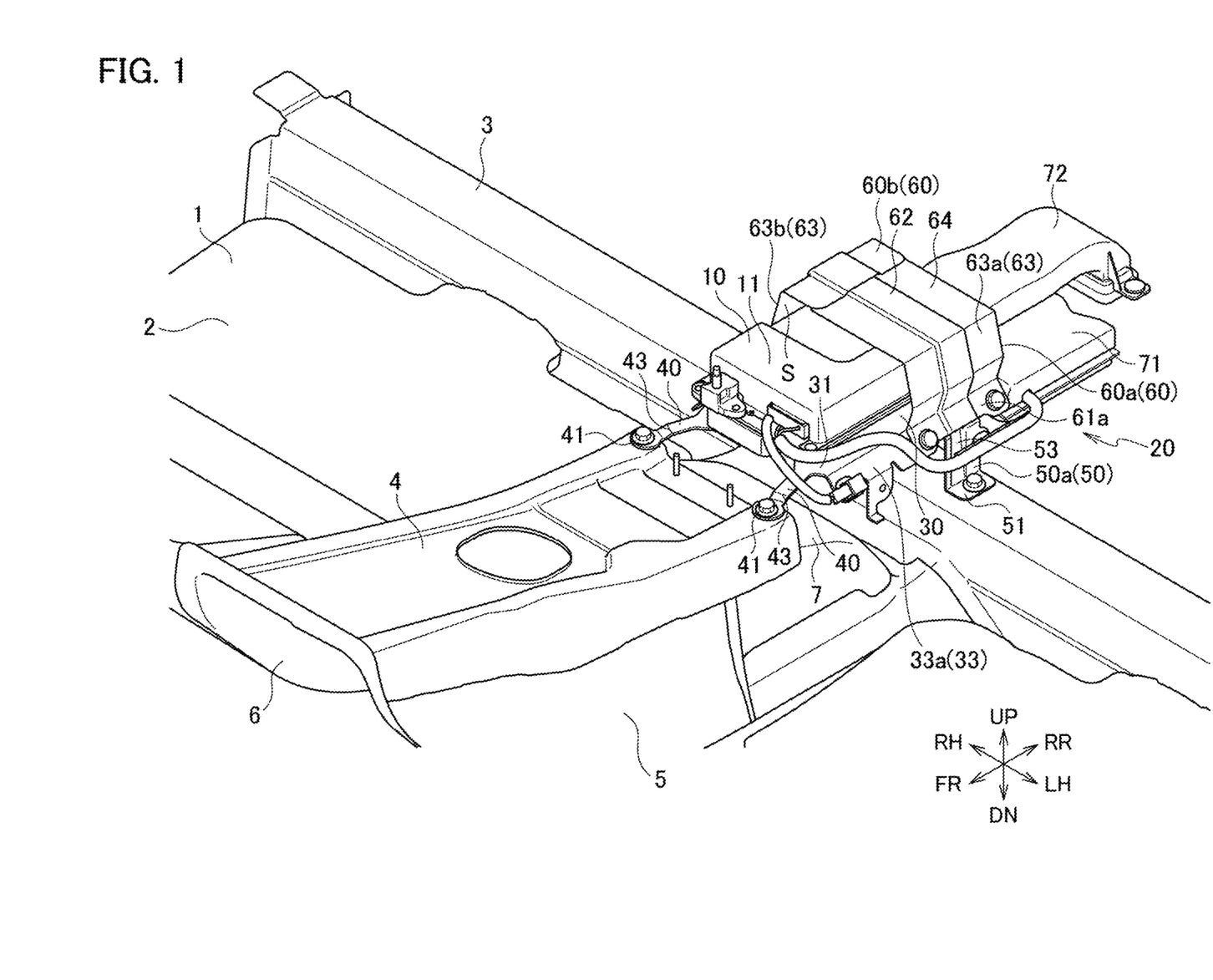
FIG. 1 is a perspective view illustrating an overall configuration of a mounting structure for an electrical device according to an embodiment.
Figure 2:
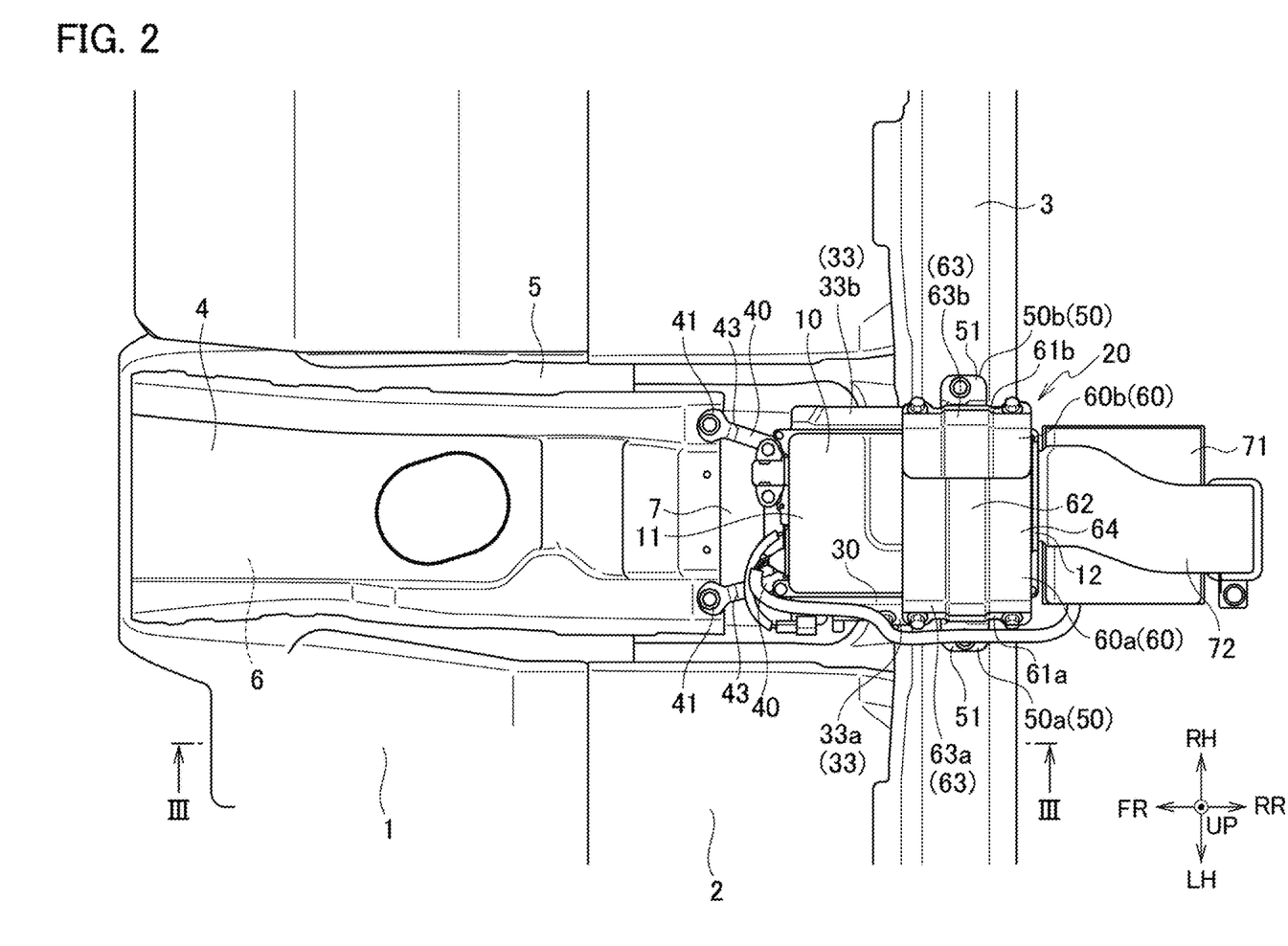
FIG. 2 is a plan view illustrating the overall configuration of the mounting structure for an electrical device according to the embodiment.
Figure 3:
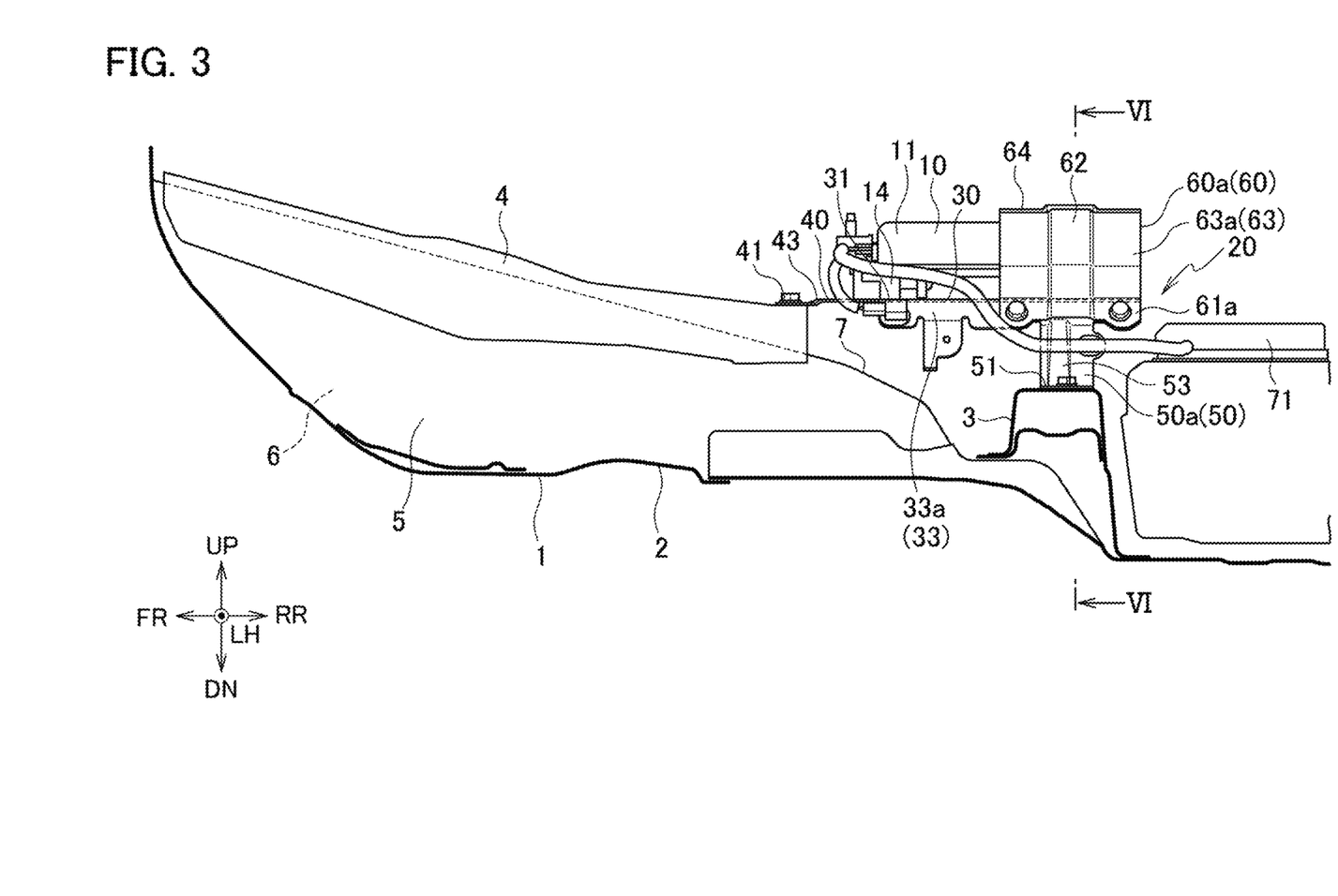
FIG. 3 is a partial cross-sectional view along line III-III of FIG. 2, which illustrates the overall configuration of the mounting structure for an electrical device according to the embodiment.
Figure 4:
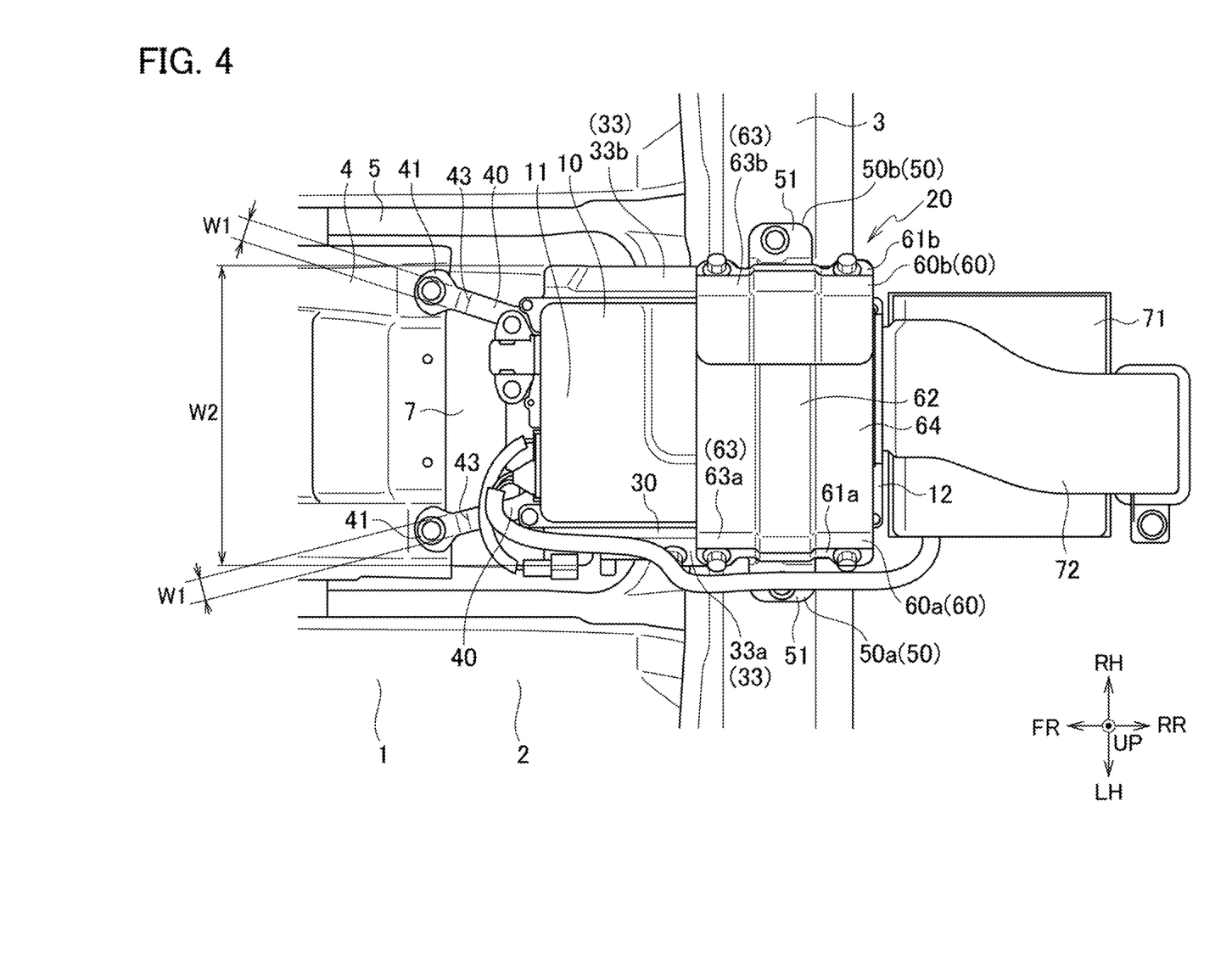
FIG. 4 is a diagram illustrating a main portion of the mounting structure for an electrical device according to the embodiment, and a plan view in the vicinity of a supporting member illustrating an arrangement relationship between the electrical device, the supporting member, and a vehicle body floor
Figure 5:
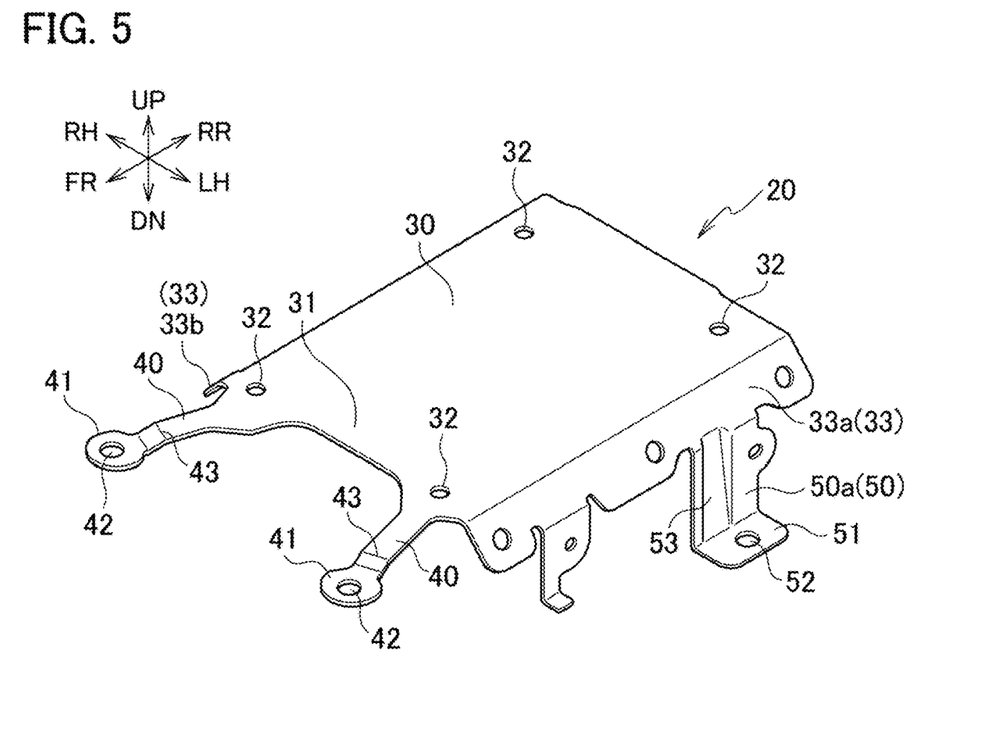
FIG. 5 is a perspective view illustrating the supporting member for the mounting structure for an electrical device according to the embodiment.

The electrical device 10 is supported at the upper side of the vehicle body floor 1 by the supporting member 20. In the illustrated example, the electrical device 10 is arranged apart toward the upper side from the vehicle body floor 1. The supporting member 20 is mounted on the vehicle body floor 1. For this reason, the electrical device 10 is mounted on the vehicle body floor 1 via the supporting member 20. As illustrated in FIG. 5, the supporting member 20 includes a body portion 30 and the front extension portions 40. The supporting member 20 may also be provided with legs 50. The supporting member 20 may be made of metal such as steel.

The body portion 30 is a portion of the supporting member 20 to which the electrical device 10 is supported and fixed. In the illustrated example, the body portion 30 is made of a plate material extending in a substantially horizontal direction, and has a substantially rectangular shape in plan view. For this reason, the electrical device 10 can be placed on the body portion 30 and fixed thereto. The body portion 30 may be made of metal such as steel. A plurality of holes 32 penetrating in the up-down direction may be formed in the body portion 30. In the example illustrated in FIG. 6, the fixing portions 14 of the electrical device 10 are fastened and fixed to the body portion 30 by fasteners such as bolts inserted into the holes 32. The arrangement relationship between the electrical device 10 and the body portion 30 is not limited to the example illustrated in the figures. For example, if the body portion 30 has a one-side body portion forming the vehicle left side and an other-side body portion forming the vehicle right side, the electrical device 10 may be suspended between the one-side body portion and the other-side body portion.

The body portion 30 may include side walls 33. The side walls 33 are walls which extend upward or downward at the end portions of the body portion 30 at the outward side in the vehicle width direction and extend in the vehicle front-rear direction. In the example illustrated in FIG. 5, the side walls 33 extend outward and downward in the vehicle width direction and, and slope downwardly toward the outward side in the vehicle width direction. In addition, the side walls 33 may include a side wall 33a and a side wall 33b. The side wall 33a is the side wall 33 formed at the vehicle left side of the body portion 30, and the side wall 33b is the side wall 33 formed at the vehicle right side of the body portion 30. By forming the side walls 33 in the body portion 30, it is possible to increase the rigidity of the body portion 30 in the vehicle front-rear direction.

The front extension portions 40 extending in the vehicle front side are formed at the end portion 31 of the body portion 30 at the vehicle front side. In the example illustrated in FIG. 5, the front extension portion 40 extending in the substantially horizontal direction is formed at each of the vehicle left side of and the right side of the end portion 31. Further, the front extension portions 40 may be formed of a flat plate having a cross-sectional shape whose dimension in the up-down direction is smaller than the dimension in the horizontal direction in the cross section perpendicular to the extension direction thereof. Further, the front extension portions 40 may be made of metal such as steel. The body portion 30 has a portion at the vehicle rear side that supports the electrical device 10 in a cantilevered manner, such as legs 50 which will be described later. In addition, the front extension portions 40 support the end portion 31 of the body portion 30. For this reason, vibration or deformation of the body portion 30 during travel of a vehicle is suppressed, thereby making it possible to hold the electrical device 10 stably.

The shape of the front extension portions 40 is not limited to the illustrated example. For example, the front extension portions 40 may be formed of a flat plate having a cross-sectional shape whose dimension in the horizontal direction is smaller than the dimension in the up-down direction in the cross section perpendicular to the extension direction thereof. In the illustrated example, the body portion 30 and the front extension portions 40 are integrally formed; however, the present invention is not limited thereto. The front extension portions 40 formed separately from the body portion 30 may be attached to the body portion 30.

The rigidity of the front extension portions 40 in the vehicle front-rear direction is made to be lower than the rigidity of the body portion 30 in the vehicle front-rear direction. In the example illustrated in FIG. 4, the dimension W1 in the width direction perpendicular and horizontal to the extension direction of the front extension portions 40 is set smaller than the dimension W2 of the end portion 31 in the vehicle width direction. The dimension W1 is the dimension in the portion of the front extension portions 40 having the smallest dimension in the width direction. The thickness of the front extension portions 40 in the up-down direction may be set smaller than the thickness of the portion in the end portion 31 in the up-down direction to which the front extension portions 40 are connected.

As illustrated in FIGS. 1 to 4, the front extension portions 40 extend toward the vehicle front side further than the end portion 11 of the electrical device 10. That is, each of the front extension portions 40 includes a portion positioned in the vehicle front side from the end portion 11. End portions 41 of the front extension portions 40 are fixed to the vehicle body floor 1. Each of the end portions 41 is an end portion of the front extension portion 40 at the vehicle front side. As illustrated in FIG. 5, holes 42 penetrating in the up-down direction are formed in the end portions 41. The end portions 41 are fastened to the end portions of the reinforcing member 4 at the vehicle rear side by fasteners such as bolts inserted into the holes 42. For this reason, the front extension portions 40 are indirectly attached to the floor panel 2 through the reinforcing member 4. The front extension portions 40 may be directly attached to the floor panel 2. For example, the front extension portions 40 may be directly attached to the floor panel 2 by fastening the end portions 41 to the end portions of the inclined surface 7 at the vehicle front side.

In the illustrated example, the front extension portions 40 extend in the substantially horizontal direction; however, the present invention is not limited thereto. The angle of the front extension portions 40 with respect to the horizontal plane can be appropriately set according to the height of the body portion 30 in the up-down direction, the shape of the vehicle body floor 1, the fixed position of the end portions 41, or the like. For example, the front extension portions 40 may extend toward the vehicle front side and the upper side, or toward the vehicle front side and the lower side. Further, the number of the front extension portions 40 is not limited to the illustrated example, and one front extension portion 40, or three or more front extension portions 40 may be provided in the body portion 30.

A bent portion 43 may be formed between the end portion of the front extension portion 40 at the body portion 30 side and the end portion 41. The bent portion 43 is formed by bending a portion of the front extension portion 40 in a direction crossing the extension direction of the front extension portion 40. In the example illustrated in FIG. 5, the bent portion 43 is formed by bending a portion of the front extension portion 40 downward in such a way that the vehicle front side is lower than the vehicle rear side.

The body portion 30 may be provided with the legs 50. The legs 50 are fixed to the vehicle body floor 1. For this reason, the body portion 30 is fixed to the vehicle body floor 1 through the legs 50. The legs 50 illustrated in FIG. 5 include a leg 50a that is arranged at one side of the body portion 30 in the vehicle width direction, and a leg 50b that is arranged at the other side of the body portion 30 in the vehicle width direction. The leg 50a is formed at the vehicle left side of the body portion 30, and extends downward from the lower-side end portion of a side wall 33a at the vehicle rear side. The leg 50b is formed at the vehicle right side of the body portion 30, and extends downward from the lower-side end portion of a side wall 33b at the vehicle rear side. The legs 50a and 50b illustrated in the figure are plate-like portions having a substantially rectangular shape when seen in the axial direction parallel to the vehicle width direction, and may be made of metal such as steel. A flange portion 51 extending outward in the vehicle width direction may be formed at each lower end portion of the legs 50a and 50b. A hole 52 penetrating in the up-down direction is formed in each of the flange portions 51, and the legs 50a and 50b are fastened to the cross member 3 by fasteners such as bolts inserted into the holes 52. For this reason, the body portion 30 is fixed to the cross member 3.

A leg rib 53 may be formed on each of the legs 50a and 50b. The leg rib 53 is formed by projecting a portion of the leg 50 in the horizontal direction, and extends in the up-down direction. In the illustrated example, the legs 50a and 50b are provided with the leg ribs 53 projecting inward in the vehicle width direction and extending in the up-down direction. This makes it possible to further increase the rigidity of the legs 50a and 50b.

In the illustrated example, the body portion 30 has two legs 50; the present invention is not limited thereto. The body portion 30 may have three or more legs 50. Alternatively, the body portion 30 may have one leg 50. In this case, for example, the leg 50 may be formed in a columnar shape extending in the up-down direction, and may be interposed between the substantially central portion in the vehicle width direction at the bottom surface of the body portion 30 and the cross member 3.

As illustrated in FIGS. 1 to 4, the supporting member 20 may include a cover 60. The cover 60 illustrated in the figures is formed by bending a plate material having a predetermined thickness, and has a substantially C-shaped shape in which the lower side is open when seen in the vehicle front-rear direction. The cover 60 may be made of metal such as steel, for example. In the illustrated example, the cover 60 covers at least a portion of the electrical device 10. A gap may be formed between the electrical device 10 and the cover 60. In addition, the cover 60 may be attached to the body portion 30 so as to extend in the vehicle front-rear direction.

The cover 60 may include cover side walls 63 and a cover upper wall 64. The cover side walls 63 are walls which form end portions of the cover 60 in the vehicle width direction and cover the electrical device 10 from the outward side in the vehicle width direction. The cover upper wall 64 is a wall which forms the upper side of the cover 60 and covers the electrical device 10 from the upper side. That is, the cover 60 may cover the electrical device 10 from the upper side, and from the outward side in the vehicle width direction. In the illustrated example, the cover 60 covers the electrical device 10 from the substantially central portion to the end portion 12 in the vehicle front-rear direction; however, the present invention is not limited thereto. For example, the cover 60 may cover the entire electrical device 10 in the vehicle front-rear direction.

The cover side walls 63 may include a cover side wall 63a forming the vehicle left side of the cover 60, and a cover side wall 63b forming the vehicle right side. A lower end portion 61a of the cover side wall 63a is fastened to a side wall 33a of the body portion 30 by a fastener such as a bolt. A lower end portion 61b of the cover side wall 63b is fastened to a side wall 33b of the body portion 30 by a fastener such as a bolt. Accordingly, the leg 50a and the leg 50b are connected to each other by the cover 60.

As illustrated in FIG. 6, a closed cross section S extending in the vehicle front-rear direction is formed between the cover 60 and the body portion 30. For this reason, it is possible to increase the rigidity of the body portion 30 in the vehicle front-rear direction more reliably. The closed cross section S is a cross section formed between the cover 60 and the body portion 30 in the cross section perpendicular to the extension direction of the cover 60. In the illustrated example, both end sides of the closed cross section S in the vehicle width direction are defined by the cover side walls 63, in which the upper side is defined by the cover upper wall 64, and the lower side is defined by the body portion 30. In addition, the closed cross section S may have a substantially rectangular shape when seen in the vehicle front-rear direction.

Since the supporting member 20 includes the cover 60, it is possible to suppress the contact of other members constituting the vehicle with the electrical device 10 at the time of a vehicle side collision. For this reason, it is possible to suppress an excessive load to be input to the electrical device 10 at the time of a vehicle side collision. For example, even if the front seat comes into contact with the center console due to a vehicle side collision and the collision load is input to the console panel, it is possible to suppress the contact between the console panel and the electrical device 10. As a result, the collision load input to the electrical device 10 can be reduced at the time of a vehicle side collision.

The cover 60 may be divided. In the example illustrated in FIGS. 1 to 4, the cover 60 includes a cover 60a at the vehicle left side, and a cover 60b at the vehicle right side. This makes it possible to attach the cover 60 to the supporting member 20 more easily. The cover 60a and the cover 60b may be partially overlapped in plan view.

The rigidity of the cover 60 in the vehicle front-rear direction may be higher than the rigidity of the body portion 30 or the front extension portion 40 in the vehicle front-rear direction. For example, the plate material forming the cover 60 may be greater in thickness than the plate material forming the body portion 30 or the front extension portion 40. In one embodiment, the plate material forming the cover 60 may have a thickness of 2 mm to 5 mm, and the plate material forming the body portion 30 or the front extension portion 40 may have a thickness of 1 mm to 3 mm. Further, the cover 60 may be made of a material that is more rigid than the body portion 30 or the front extension portion 40.

The cover 60 may also be formed with a rib 62. The rib 62 is formed by projecting a portion of the cover 60 in a direction perpendicular to the vehicle front-rear direction. In the illustrated example, the rib 62 is formed by projecting the substantially central portions of the cover side walls 63 in the vehicle front-rear direction outward in the vehicle width direction and projecting the substantially central portion of the cover upper wall 64 in the vehicle front-rear direction upward. The rigidity of the cover 60 can be further increased by providing the rib 62.

Hereinafter, an operation and effect of the mounting structure for an electrical device according to an embodiment will be described.

(1) A mounting structure for an electrical device according to the embodiment includes: a vehicle electrical device 10; and a supporting member 20 which supports the electrical device 10 at an upper side of a vehicle body floor 1, in which the supporting member 20 includes: a body portion 30 to which the electrical device 10 is supported and fixed; and a front extension portion 40 extending from the body portion 30 toward a vehicle front side further than an end portion 11 of the electrical device 10 at a vehicle front side, and the body portion 30 and an end portion 41 of the front extension portion 40 at the vehicle front side are fixed to the vehicle body floor 1, and a rigidity of the front extension portion 40 in a vehicle front-rear direction is lower than a rigidity of the body portion 30 in the vehicle front-rear direction.

In the mounting structure for an electrical device according to the embodiment, a collision load at the time of a vehicle front collision is input from the vehicle body floor 1 to the front extension portion 40 of the supporting member 20. In the example illustrated in FIG. 7, the collision load is transmitted in the direction indicated by the arrow A via the reinforcing member 4 and is input to the front extension portion 40. A rigidity of the front extension portion 40 in a vehicle front-rear direction is lower than a rigidity of the body portion 30 in the vehicle front-rear direction. For this reason, the deformation of the front extension portion 40 is easily provoked. In the example illustrated in FIG. 1, the front extension portion 40 is bent and deformed in the up-down direction as illustrated by the arrow B because the collision load is input to the front extension portion 40 at the time of a vehicle front collision. In the mounting structure for an electrical device according to the embodiment, part of the collision load can be absorbed because such deformation of the front extension portion 40 is provoked. This makes it possible to reduce the collision load transmitted to the body portion 30. For this reason, the displacement of the electrical device 10 toward the vehicle rear side can be suppressed at the time of a vehicle front collision. As a result, an excessive collision load to be input to a different vehicle-mounted device or the like arranged at the vehicle rear side of the electrical device 10 can be suppressed.

(2) In the mounting structure for an electrical device according to the embodiment, the body portion 30 may be fixed to the cross member 3 of the vehicle body floor 1.

In the mounting structure for an electrical device according to the embodiment, even when a collision load due to a vehicle front collision is input to the body portion 30, the collision load is transmitted to the cross member 3. Since the cross member 3 has a high rigidity, the displacement of the body portion 30 toward the vehicle rear side is suppressed. Accordingly, the displacement of the electrical device 10 toward the vehicle rear side can be suppressed more reliably at the time of a vehicle front collision.

(3) In the mounting structure for an electrical device according to the embodiment, the supporting member 20 may include a cover 60 which covers at least a portion of the electrical device 10, and the cover 60 may be fixed to the body portion 30, and form a closed cross section S extending in the vehicle front-rear direction together with the body portion 30.

In the mounting structure for an electrical device according to the embodiment, since the supporting member 20 includes the cover 60, it is possible to suppress the contact of other members constituting the vehicle with the electrical device 10 at the time of a vehicle side collision. For this reason, it is possible to suppress an excessive load to be input to the electrical device 10 at the time of a vehicle side collision. For example, even if the front seat comes into contact with the center console due to a vehicle side collision and the collision load is input to the console panel, it is possible to suppress the contact between the console panel and the electrical device 10. As a result, the collision load input to the electrical device 10 can be reduced at the time of a vehicle side collision. Further, since the closed cross section S is formed between the cover 60 and the body portion 30, it is possible to increase the rigidity of the body portion 30 in the vehicle front-rear direction more reliably. This makes it possible to provoke the deformation of the front extension portion 40 more reliably at the time of a vehicle front collision. Accordingly, it is possible to suppress the displacement of the electrical device 10 toward the vehicle rear side at the time of a vehicle front collision.

The supporting member 20 may include the cover 60 that covers at least a portion of the electrical device 10, and the body portion 30 may include a one-side leg 50a which is arranged at one side of the body portion 30 in the vehicle width direction and fixed to the vehicle body floor 1, and an other-side leg 50b which is arranged at the other side of the body portion 30 in the vehicle width direction and fixed to the vehicle body floor 1, and the cover 60 may connect the one-side leg 50a and the other-side leg 50b. When a larger collision load is input to one side in the vehicle width direction than to the other side in the vehicle width direction at the time of a vehicle front collision, a larger collision load than that transmitted to the other-side leg 50b in the vehicle width direction is input to the one-side leg 50a of the body portion 30 in the vehicle width direction. In the mounting structure for an electrical device according to the embodiment, the leg 50a and the leg 50b are connected by the cover 60. For this reason, part of the collision load input to the leg 50a can be transmitted to the leg 50b more reliably. This makes it possible to suppress a backward inclination of the leg 50a more reliably. Accordingly, it is possible to suppress the displacement of the electrical device 10 toward the vehicle rear side at the time of a vehicle front collision.

(4) In the mounting structure for an electrical device according to the embodiment, the electrical device 10 may include a heat radiation fin 15 extending in the vehicle front-rear direction.

In the mounting structure for an electrical device according to the embodiment, the rigidity of the electrical device 10 in the vehicle front-rear direction can be further increased by providing the heat radiation fin 15 extending in the vehicle front-rear direction. For this reason, it is possible to increase the rigidity of the body portion 30 in the front-rear direction to which the electrical device 10 is supported and fixed more reliably. This makes it possible to provoke the deformation of the front extension portion 40 more reliably when a collision load due to a vehicle front collision is input to the front extension portion 40. Accordingly, it is possible to suppress the displacement of the electrical device 10 toward the vehicle rear side at the time of a vehicle front collision.

(5) In the mounting structure for an electrical device according to the embodiment, the vehicle body floor 1 may include an inclined surface 7 having a downward slope toward a vehicle rear side in a region facing the front extension portion 40 in an up-down direction.

Figure 7:
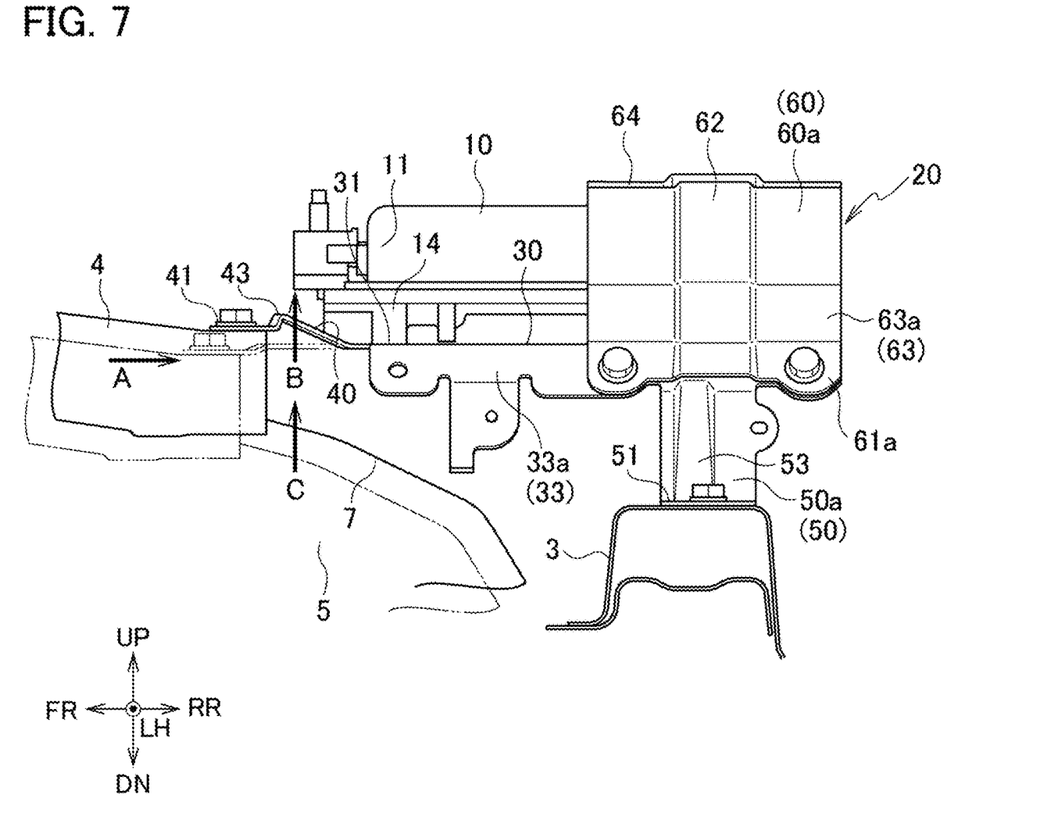
FIG. 7 is a diagram illustrating an operation and effect of the mounting structure for an electrical device according to the embodiment, and a side view in the vicinity of the supporting member illustrating a displacement of the vehicle body floor and a deformation of a front extension portion at the time of a vehicle front collision.

In the mounting structure for an electrical device according to the embodiment, the inclined surface 7 can be displaced upward due to a collision load input to the vehicle body floor 1 at the time of a vehicle front collision, as illustrated by the arrow C in FIG. 7. As a result, part of the collision load is input to the front extension portions 40 as a load moving from the lower side to the upper side. For this reason, a bending deformation of the front extension portion 40 in the up-down direction can be provoked more reliably. This makes it possible to reduce the collision load transmitted to the body portion 30 more reliably. Accordingly, the displacement of the electrical device 10 toward the vehicle rear side can be suppressed at the time of a vehicle front collision more reliably.

As in the example illustrated in FIG. 5, a bent portion 43 may be formed between the end portion of the front extension portion 40 at the body portion 30 side and the end portion 41. This makes it possible to provoke a bending deformation of the front extension portion 40 in the bent portion 43 easily when a collision load due to a vehicle front collision is input to the front extension portion 40. Accordingly, the deformation of the front extension portions 40 can be provoked more reliably at the time of a vehicle front collision, thereby making it possible to absorb part of the collision load. As a result, the displacement of the electrical device 10 toward the vehicle rear side can be suppressed at the time of a vehicle front collision more reliably.

As in the illustrated example, the front extension portion 40 may extend in a substantially horizontal direction. As a result, part of the collision load due to a vehicle front collision is input to the front extension portion 40 easily as a bending load moving from the lower side to the upper side. Accordingly, a bending deformation of the front extension portion 40 in the up-down direction can be induced more reliably.

In addition, the front extension portion 40 may have a cross-sectional shape whose dimension in the up-down direction is smaller than that in the horizontal direction in a cross section perpendicular to the extension direction thereof. Thus, a bending deformation of the front extension portion 40 in the up-down direction can be more reliably induced.

The mounting structure for an electrical device according to the embodiment can be applied to hybrid vehicles, electric vehicles (EV), and the like.

LIST OF REFERENCE NUMERALS

1 Vehicle body floor
3 Cross member
7 Inclined surface
10 Electrical device
11 End portion
15 Heat radiation fin
20 Supporting member
30 Body portion
40 Front extension portion
41 End portion
50, 50*a*, 50*b* Leg
60, 60*a*, 60*b* Cover
S Closed cross section

The invention claimed is:

1. A mounting structure for an electric device comprising:
a vehicle electric device; and
a supporting member which supports the electric device at an upper side of a vehicle body floor, wherein
the supporting member includes: a body portion to which the electric device is supported and fixed; and a front extension portion extending from the body portion toward a vehicle front side further than an end portion of the electric device at a vehicle front side,
the body portion and an end portion of the front extension portion at the vehicle front side are fixed to the vehicle body floor,
a rigidity of the front extension portion in a vehicle front-rear direction is lower than a rigidity of the body portion in the vehicle front-rear direction,
the supporting member includes a cover that covers at least a portion of the electric device, and
the cover is fixed to the body portion, and forms a closed cross section extending in the vehicle front-rear direction together with the body portion.

2. The mounting structure for the electric device according to claim 1,
wherein the body portion is fixed to a cross member of the vehicle body floor.

3. The mounting structure for the electric device according to claim 1, wherein
the body portion includes a one-side leg which is arranged at one side of the body portion in a vehicle width direction and fixed to the vehicle body floor, and an other-side leg which is arranged at the other side of the body portion in the vehicle width direction and fixed to the vehicle body floor, and
the cover connects the one-side leg and the other-side leg.

4. The mounting structure for the electric device according to claim 1,
wherein the electric device includes a heat radiation fin extending in the vehicle front-rear direction.

5. The mounting structure for the electric device according to claim 1,
wherein the vehicle body floor includes an inclined surface having a downward slope toward a vehicle rear side in a region facing the front extension portion in an up-down direction.

* * * * *